(No Model.)
J. S. FLETCHER.
MOTOR.
No. 277,893. Patented May 22, 1883.
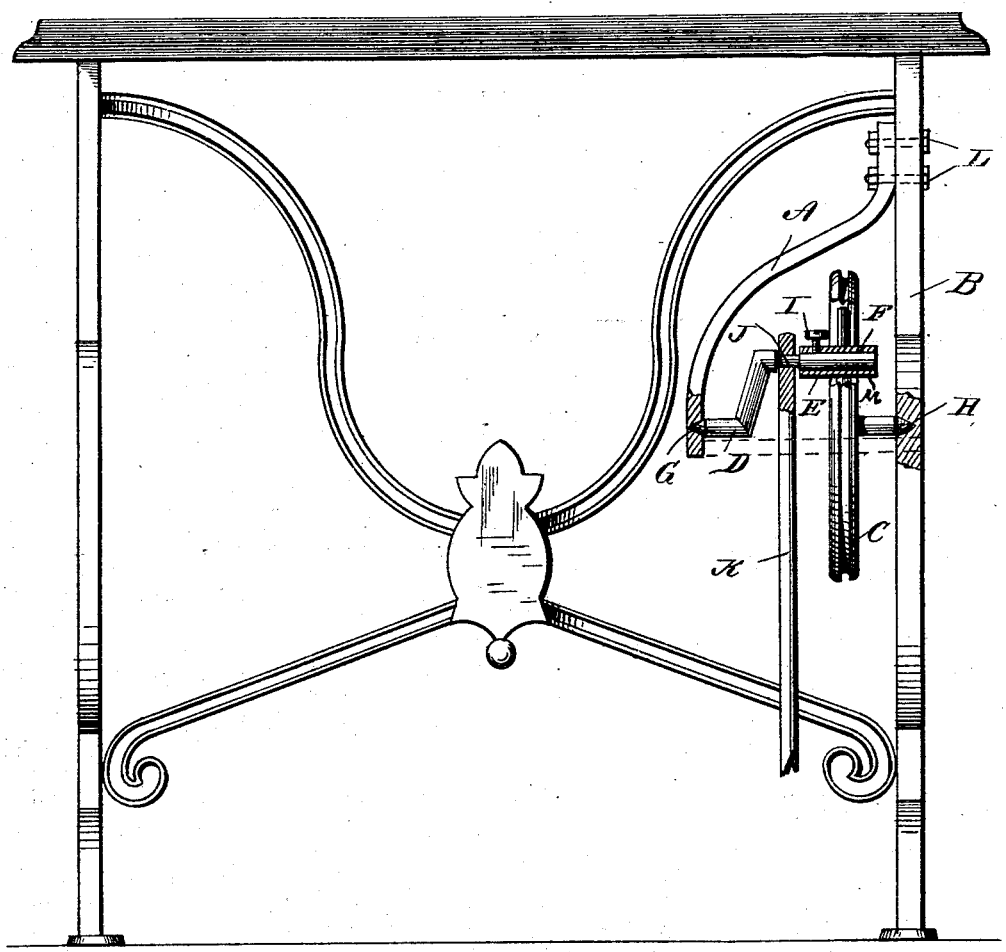
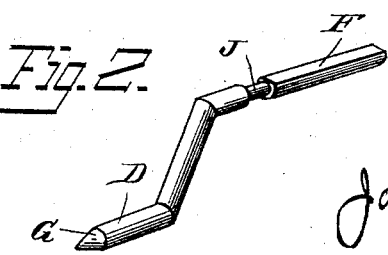
WITNESSES
F. L. Durand
Jas. L. Falbey.
James S. Fletcher
INVENTOR
By H. J. Ennis
Attorney

UNITED STATES PATENT OFFICE.

JAMES S. FLETCHER, OF CHICAGO, ILLINOIS.

MOTOR.

SPECIFICATION forming part of Letters Patent No. 277,893, dated May 22, 1883.

Application filed October 23, 1882. (No model.)

*To all whom it may concern:*

Be it known that I, JAMES S. FLETCHER, a citizen of the Dominion of Canada, residing at Chicago, in the county of Cook and State of Illinois, have invented new and useful Improvements in Motors, of which the following is a specification, reference being had therein to the accompanying drawings.

My invention has relation to the crank-shaft and bearings of the various forms of motors for pedal and other similar machinery; and the object of the invention is to so construct and combine the crank-shaft, balance-wheel, and the journals and bearing that they may be simple in operation, cheap, and strong, as well as adjustable for wear and tear, and little or no liability to derangement of parts while in use. To that end the novelty consists in the construction of the same, as will be hereinafter more fully set forth, and particularly pointed out in the claims.

In the drawings similar letters of reference indicate like parts of the invention.

Figure 1 is a front elevation of a sewing-machine stand with my device applied thereto, and Fig. 2 is a detached view of the crank-shaft removed from its bearing and the balance-wheel.

B, B', and B² are the legs and top of an ordinary sewing-machine stand. The leg B is provided with a bracket, A, having a brace, a.

C is the fly-wheel, and is provided with a shaft, the outer end of which forms a bearing, H, in the leg B.

D is the driving-shaft, and its outer end forms a bearing, G, in the bracket A a, while the other end, F, enters a hub, E, passing through the wheel C. This hub is provided with a set-screw, I, by means of which the shaft D may be longitudinally adjusted in the bearings in the frame and bracket, and that portion F of the shaft D is cut away, so that the screw I will always draw the bearings G and H in line or true to each other.

J is the journal for the pitman K, by means of which motion is communicated to the shaft D and wheel C.

By loosening the screw I the bearings G and H from time to time as they wear, or the parts, may be removed or replaced, as desired.

Having thus fully described my invention, what I claim as new, and desire to secure by Letters Patent of the United States, is—

1. The combination, with a shaft and fly or driving-wheel, of the leg B, provided with the bracket A, having an arm, a, extending to the front or rear at a right angle to the bracket, substantially as and for the purpose set forth.

2. The shaft D, provided with the journal G, in combination with the balance-wheel C, having hub E, screw I, and shaft-bearing H, as set forth.

3. The shaft D, provided with the cut-away portion, F, in combination with the wheel C, hub E, screw I, and shaft-bearing H, as set forth.

In testimony whereof I affix my signature in presence of two witnesses.

JAMES S. FLETCHER.

Witnesses:
 D. O'DONUGHUE,
 MICHAEL HUGHES.